(12) United States Patent
Hall et al.

(10) Patent No.: US 9,387,886 B2
(45) Date of Patent: Jul. 12, 2016

(54) FASTENERS INTEGRATED INTO A VEHICLE FRAME

(71) Applicant: David R. Hall, Provo, UT (US)

(72) Inventors: David R. Hall, Provo, UT (US);
Stephen Hall, Sandy, UT (US)

( * ) Notice: Subject to any disclaimer, the term of this patent is extended or adjusted under 35 U.S.C. 154(b) by 0 days.

(21) Appl. No.: 14/662,712

(22) Filed: Mar. 19, 2015

(65) Prior Publication Data
US 2015/0266517 A1 Sep. 24, 2015

Related U.S. Application Data

(60) Provisional application No. 61/968,321, filed on Mar. 20, 2014.

(51) Int. Cl.
| | |
|---|---|
| *B60J 7/00* | (2006.01) |
| *B62D 25/00* | (2006.01) |
| *B62D 23/00* | (2006.01) |
| *B60G 3/20* | (2006.01) |
| *B60G 7/02* | (2006.01) |

(52) U.S. Cl.
CPC *B62D 25/00* (2013.01); *B60G 3/20* (2013.01); *B60G 7/02* (2013.01); *B62D 23/00* (2013.01); *B60G 2200/144* (2013.01); *B60G 2204/13* (2013.01); *B60G 2204/421* (2013.01); *B60G 2300/122* (2013.01)

(58) Field of Classification Search
CPC ........ Y02B 60/50; B01D 21/06; B01D 21/22; B65H 2511/11; G06K 7/10722; B60P 3/08; G07B 15/063; B62D 1/28; G01S 13/931; G01C 21/28

USPC ........... 296/203.01; 180/168; 224/321, 917.5, 224/924

See application file for complete search history.

(56) References Cited

U.S. PATENT DOCUMENTS

| | | | | | |
|---|---|---|---|---|---|
| 1,155,717 | A | * | 10/1915 | Fouts | F16B 43/001 285/363 |
| 2,649,126 | A | * | 8/1953 | Tinnerman | B60Q 1/0683 411/113 |
| 3,009,499 | A | * | 11/1961 | Weihe | F16B 37/041 29/432 |
| 3,050,160 | A | * | 8/1962 | Chesser | F16B 5/07 29/513 |
| 3,373,789 | A | * | 3/1968 | Parkin | F16B 37/043 411/112 |
| 3,554,415 | A | * | 1/1971 | Woods | B62D 43/04 224/42.21 |
| 3,999,583 | A | * | 12/1976 | Nelson | F16B 37/041 411/182 |
| 4,272,114 | A | * | 6/1981 | Hirano | F16F 7/12 188/377 |
| 4,365,736 | A | * | 12/1982 | Stumm | E04B 1/5806 228/121 |
| 4,573,734 | A | * | 3/1986 | Gass | B62D 21/152 293/134 |

(Continued)

FOREIGN PATENT DOCUMENTS

EP 2589561 8/2013

*Primary Examiner* — Kiran B Patel

(57) ABSTRACT

A vehicle frame may comprise a plurality of interlocking frame members forming a three-dimensional structure. The three-dimensional structure may comprise a main body and at least one appendage protruding from the main body. The appendage may have an attachment device disposed thereon for attachment of a component.

16 Claims, 7 Drawing Sheets

(56) References Cited

U.S. PATENT DOCUMENTS

| | | | | |
|---|---|---|---|---|
| 4,674,931 | A * | 6/1987 | Schwind | F16B 37/041 411/175 |
| 4,729,706 | A * | 3/1988 | Peterson | F16B 37/041 411/112 |
| 4,798,507 | A * | 1/1989 | Olah | F16B 37/041 411/175 |
| 4,826,061 | A * | 5/1989 | Heideman | B60R 9/045 224/321 |
| 4,955,772 | A * | 9/1990 | Reck | F16B 37/041 411/175 |
| 4,978,164 | A * | 12/1990 | Nakamura | B62D 25/025 156/92 |
| 5,098,242 | A * | 3/1992 | Schaty | F16B 37/0842 411/339 |
| 5,297,921 | A * | 3/1994 | Springer | B65G 69/003 414/396 |
| 5,593,245 | A * | 1/1997 | Herz | B62D 33/044 296/205 |
| 5,882,054 | A * | 3/1999 | Devilliers | B60R 19/24 293/155 |
| 5,915,781 | A | 6/1999 | DeRees | |
| 6,000,748 | A * | 12/1999 | Tomforde | B62D 65/06 296/202 |
| 6,131,286 | A | 10/2000 | Kelly | |
| 6,431,549 | B1 * | 8/2002 | Hill | B05C 5/0216 156/295 |
| 6,827,390 | B2 * | 12/2004 | Zummallen | B62D 25/04 296/146.11 |
| 6,895,651 | B2 * | 5/2005 | Li | B21D 39/038 29/462 |
| 6,907,666 | B2 | 6/2005 | Mills | |
| 7,044,677 | B2 * | 5/2006 | Moser | B21D 39/038 228/135 |
| 7,182,563 | B2 * | 2/2007 | Wimmer | F16B 37/041 411/174 |
| 7,267,394 | B1 * | 9/2007 | Mouch | B62D 25/082 296/187.09 |
| 7,469,956 | B2 * | 12/2008 | Yasuhara | B60R 19/34 293/133 |
| 7,571,954 | B2 * | 8/2009 | Hedderly | B62D 25/16 296/187.09 |
| 7,591,502 | B2 * | 9/2009 | Hedderly | B60J 5/0405 188/377 |
| 7,594,690 | B2 * | 9/2009 | Hedderly | B60J 5/0405 16/242 |
| 7,618,087 | B2 * | 11/2009 | Hedderly | B62D 25/16 296/193.09 |
| 7,703,841 | B2 * | 4/2010 | Hedderly | B62D 29/008 296/193.01 |
| 7,798,560 | B2 * | 9/2010 | Hedderly | B60J 5/0405 296/187.03 |
| 7,810,876 | B2 * | 10/2010 | Hedderly | B62D 25/08 296/193.04 |
| 7,849,601 | B2 * | 12/2010 | Hedderly | B62D 23/00 29/429 |
| 7,850,226 | B2 * | 12/2010 | Hedderly | B62D 21/152 296/193.01 |
| 7,959,392 | B2 * | 6/2011 | Cooley | B29C 45/2618 411/174 |
| 8,038,205 | B2 * | 10/2011 | Hedderly | B60J 5/0405 296/203.03 |
| 8,047,311 | B2 * | 11/2011 | Waletzko | B62D 55/084 180/299 |
| 8,123,284 | B2 * | 2/2012 | Hedderly | B62D 27/023 296/193.06 |
| 8,177,277 | B2 * | 5/2012 | Hedderly | B62D 23/00 296/193.04 |
| 8,215,692 | B2 * | 7/2012 | Oriet | B60K 1/04 180/65.1 |
| 8,317,964 | B2 * | 11/2012 | Hedderly | B62D 65/02 156/293 |
| 8,398,159 | B1 * | 3/2013 | Hall | B62D 23/00 296/203.01 |
| 8,882,183 | B2 * | 11/2014 | Suzuki | B62D 25/04 296/203.01 |
| 8,919,717 | B2 * | 12/2014 | Hauser | F16B 37/0842 248/309.1 |
| 8,950,993 | B2 * | 2/2015 | Gagne | F16B 37/08 411/433 |
| 8,955,902 | B2 * | 2/2015 | Glaser | F16B 5/121 160/368.1 |
| 8,974,164 | B2 * | 3/2015 | Benedetti | 411/186 |
| 2005/0045680 | A1 | 3/2005 | Ozkok | |
| 2008/0169680 | A1 | 7/2008 | Hedderly | |
| 2012/0324699 | A1 | 12/2012 | Deachin | |
| 2013/0009381 | A1 | 1/2013 | Colegrove | |

\* cited by examiner

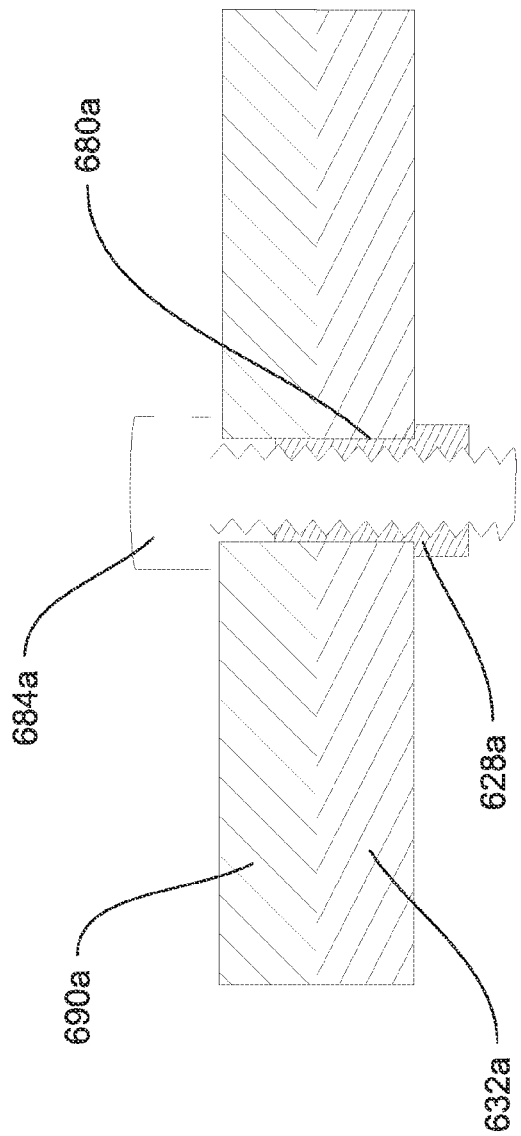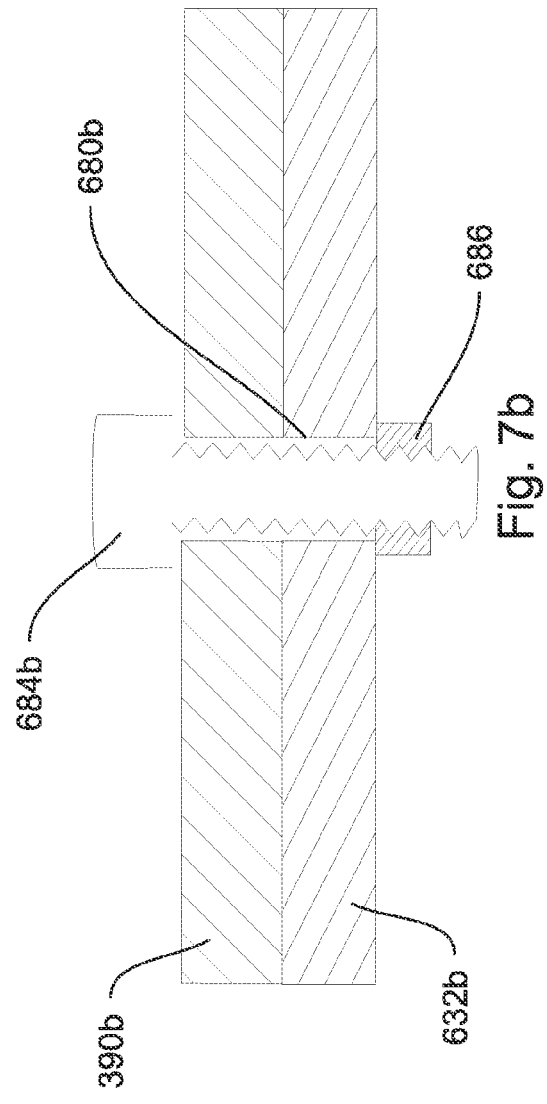

FASTENERS INTEGRATED INTO A VEHICLE FRAME

CROSS REFERENCE TO RELATED APPLICATIONS

This patent application claims priority to U.S. Provisional Pat. App. No. 61/968,321 filed Mar. 20, 2014, which is incorporated herein by reference for all that it contains.

BACKGROUND OF THE INVENTION

The present invention relates generally to frames for vehicles such as automobiles, boats, airplanes, and the like. More specifically, the present invention relates to fasteners for vehicle frames integrally formed with such frames.

A vehicle frame, also known as a chassis, may provide a supporting structure for a vehicle. Such frames must typically be strong enough to withstanding the static and dynamic loads experienced by the vehicle. Elements that may apply loads to a vehicle may include the weight of the vehicle body itself plus any passengers and/or cargo. As a vehicle travels, it may also be subjected to torsional loads created by traveling over uneven surfaces, lateral loads created by steering the vehicle, torque created by the engine and transmission, longitudinal loads created by acceleration and breaking, and sudden impacts from collisions. In order to withstand such loads, vehicle frames are traditionally large, heavy, expensive and difficult to manufacture.

All other vehicle components such as lights, seats, upholstery, handles, radios, and speakers may be attached to the frame. Attachment has traditionally been accomplished by fasteners welded to the frame. This welding may increase the difficulty of manufacture as well as adding to the overall weight of the vehicle.

Various attempts have been made to reduce the cost and difficulty of manufacturing these large structural bodies. For example, U.S. Pat. App. No. 2008/0169680 to Hedderly describes a vehicle body assembly having a set of castings. Each member of the set of castings interlocks with another member of the set of castings to create a vehicle body structure. Another example is disclosed in U.S. Pat. No. 8,398,159 to Hall that describes a vehicle frame comprising a plurality of frame members including at least two side plate members interlocked with a bottom plate member and a vertically loaded plate member. The side plate members support the bottom plate member and the vertically loaded plate member through a plurality of tab and slot connections.

While these developments represent improvements in the art, a need still exists for reduction in cost and difficulty of vehicle frame construction. Particularly, fasteners for connecting additional parts, such as interior trim or lighting, to vehicle frames are generally welded thereto. For example, U.S. Pat. No. 7,182,563 to Wimmer et al. describes a stud affixed to a body of a vehicle by welding and a fastened threaded onto the stud. U.S. Pat. No. 8,955,902 to Glaser et al. also describes a fastener affixed to a wall surface of a cab frame by projection welding or arc welding. The heat produced by such welding may distort or damage a surface of a vehicle body and add weight to the overall structure.

Thus, a need exists for fasteners for connecting various elements to vehicle frames that are simple, inexpensive, and harmless to the frames.

BRIEF SUMMARY OF THE INVENTION

A vehicle frame may comprise a plurality of interlocking frame members forming a three-dimensional structure. The three-dimensional structure may comprise a main body and at least one appendage protruding from the main body. The appendage may be formed from a plurality of interlocking frame members and at least one of the plurality of interlocking frame members may only form part of the appendage. Some of the interlocking frame members forming the appendage may be parallel with each other.

The plurality of interlocking frame members may comprise generally flat plates or bent plates. Such plates may be laser cut or stamped from larger plates. Such plates may also be formed of aluminum. The plates may be held together by a plurality of tab and slot connections which may further be welded in place.

The appendage may have an attachment device disposed thereon. The attachment device may comprise a hole or several holes disposed in one or several of the plurality of interlocking frame members forming the appendage. When several holes are present, they may be coaxial. The hole may comprise a threaded rivet secured therein formed of steel. The hole may also comprise a bolt secured therein.

A component such as a light, seat, handle, lock, wheel, or shock may be secured to one or more appendages.

BRIEF DESCRIPTION OF THE DRAWINGS

FIGS. 7a and 7b are longitudinal-section views of embodiments of attachment devices disposed on appendages.

DETAILED DESCRIPTION OF THE DRAWINGS

Figure 1:
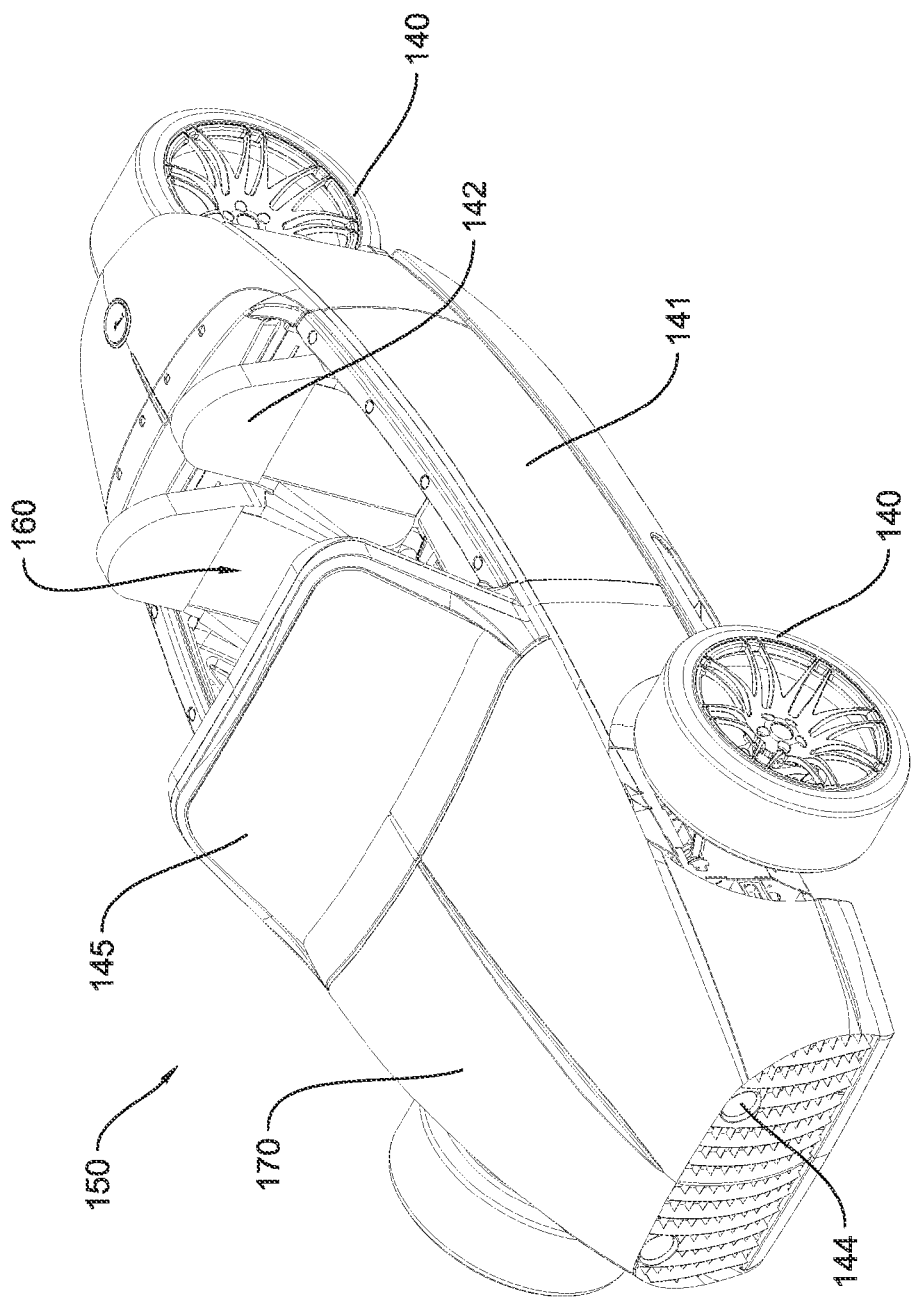
FIG. 1 is a perspective view of an embodiment of a vehicle.
Figure 2A:
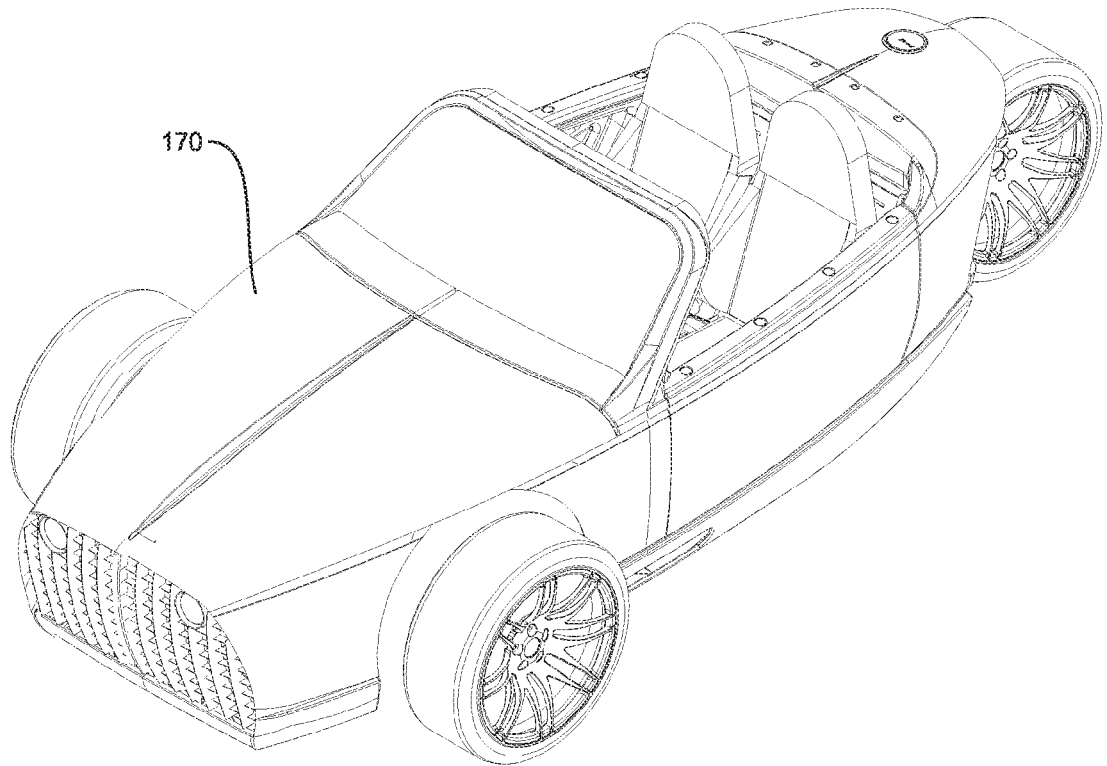
FIGS. 2a and 2b are perspective views of the vehicle body and the vehicle frame respectively of the embodiment of FIG. 1.
Figure 2B:
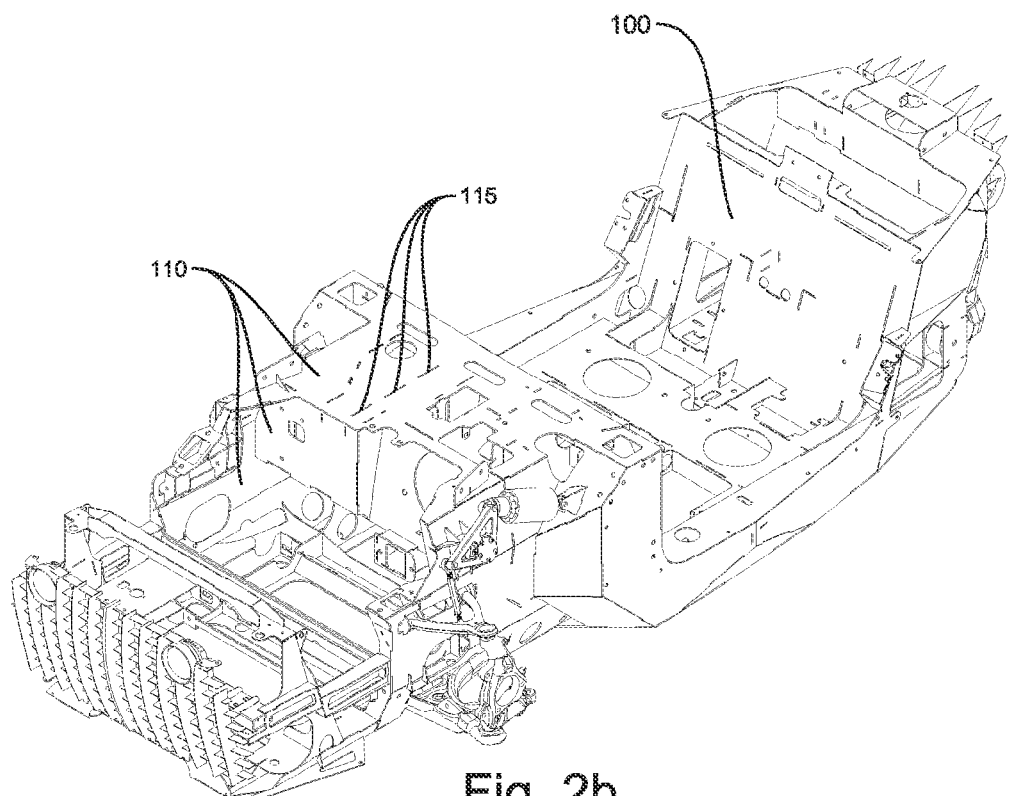

FIGS. 1, 2a and 2b show an embodiment of a vehicle 150 capable of transporting passengers and cargo over land. While the embodiment shown comprises a three-wheeled car, it should be understood that the present invention may be useful with various types of vehicles including automobiles, boats, airplanes, and the like. The vehicle 150 may comprise various components such as a plurality of wheels 140, doors 141, seats 142, lights 144, and windows 145 as well as a passenger compartment 160 and other elements that may enhance comfort, safety and ease of use of the vehicle 150. The vehicle 150 may comprise a vehicle body 170 mounted on a vehicle frame 100. In FIGS. 2a and 2b, the vehicle body 170 has been removed from the vehicle frame 100 to illustrate how the vehicle frame 100 may comprise a plurality of interlocking frame members 110 forming a three-dimensional structure. The three-dimensional structure may be designed to support the vehicle's mechanical components and body while withstanding the static and dynamic loads experienced by the vehicle. These static and dynamic loads may include the weight of the vehicle body, passengers, and cargo loads; vertical and torsional twisting created by traveling over uneven surfaces; transverse lateral forces created by road conditions, side winds, and steering of the vehicle; torque created by the engine and transmission; longitudinal tensile forces created by acceleration and compression forces created by braking of the vehicle; and sudden impacts from collisions.

As can be seen, some of the plurality of interlocking frame members 110 may comprise generally flat plates while others may comprise bent plates. Such plates may be held together by a plurality of tab and slot connections 115. Such tab and slot connections 115 may provide support to the three-dimensional structure as well as hold the three-dimensional structure together while it is being welded. By holding the three-dimensional structure together while it is being welded, the tab and slot connections 115 may obviate a jig and lead to easier and less expensive manufacture. The tab and slot connections 115, along with the rest of the plates, may be formed by laser cutting or stamping the plates out from larger plates. Additionally, the plates may be formed of aluminum to minimize the weight of the vehicle.

Figure 3:
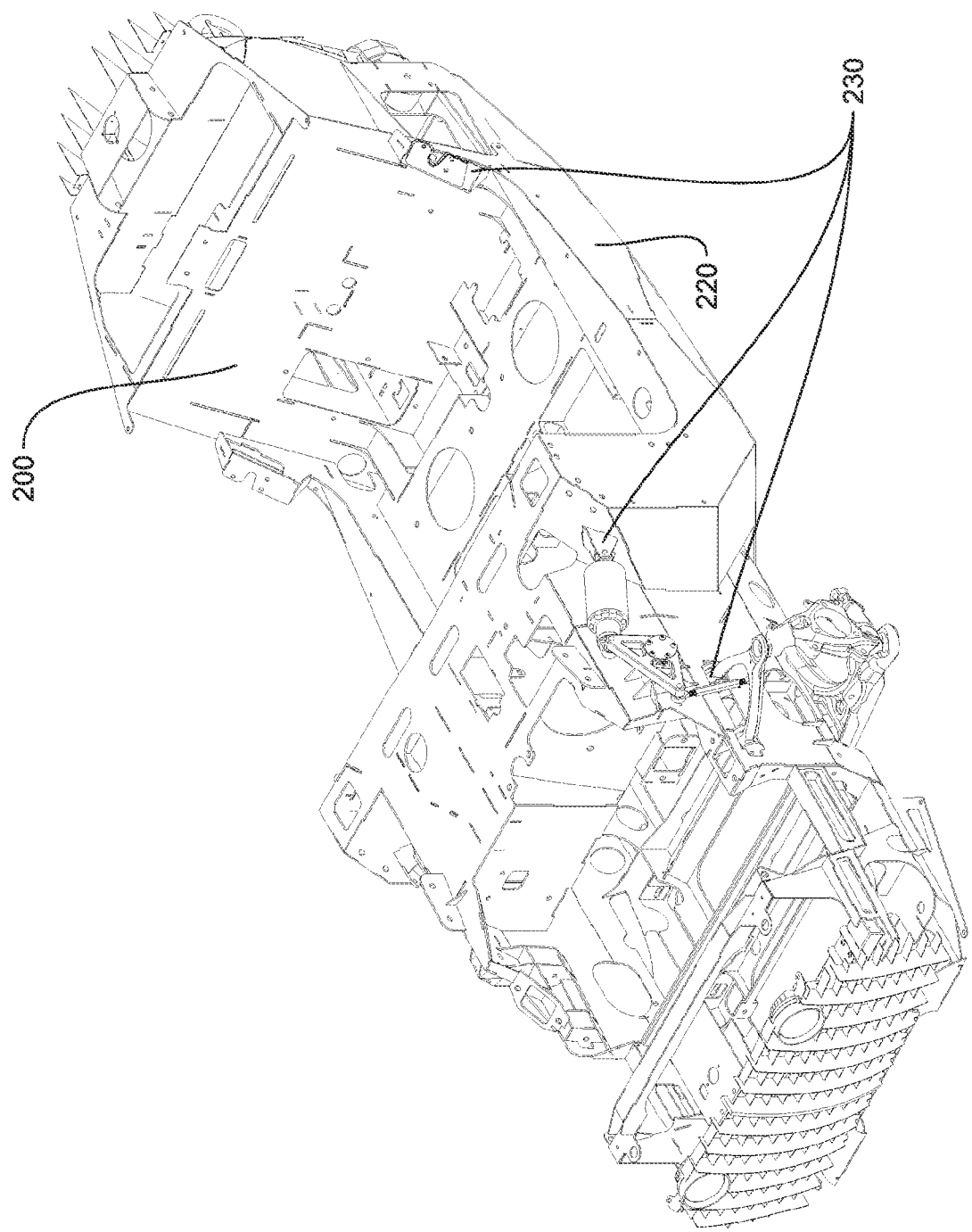
FIG. 3 is a perspective view of an embodiment of a vehicle frame comprising several appendages protruding from a main body.

FIG. 3 shows an embodiment of a vehicle frame 200. The vehicle frame 200 may comprise a three-dimensional structure comprising a main body 220 and several appendages 230 protruding from the main body 220. The appendages 230 may be formed from a plurality of interlocking frame members that also form the main body 220.

Figure 4:
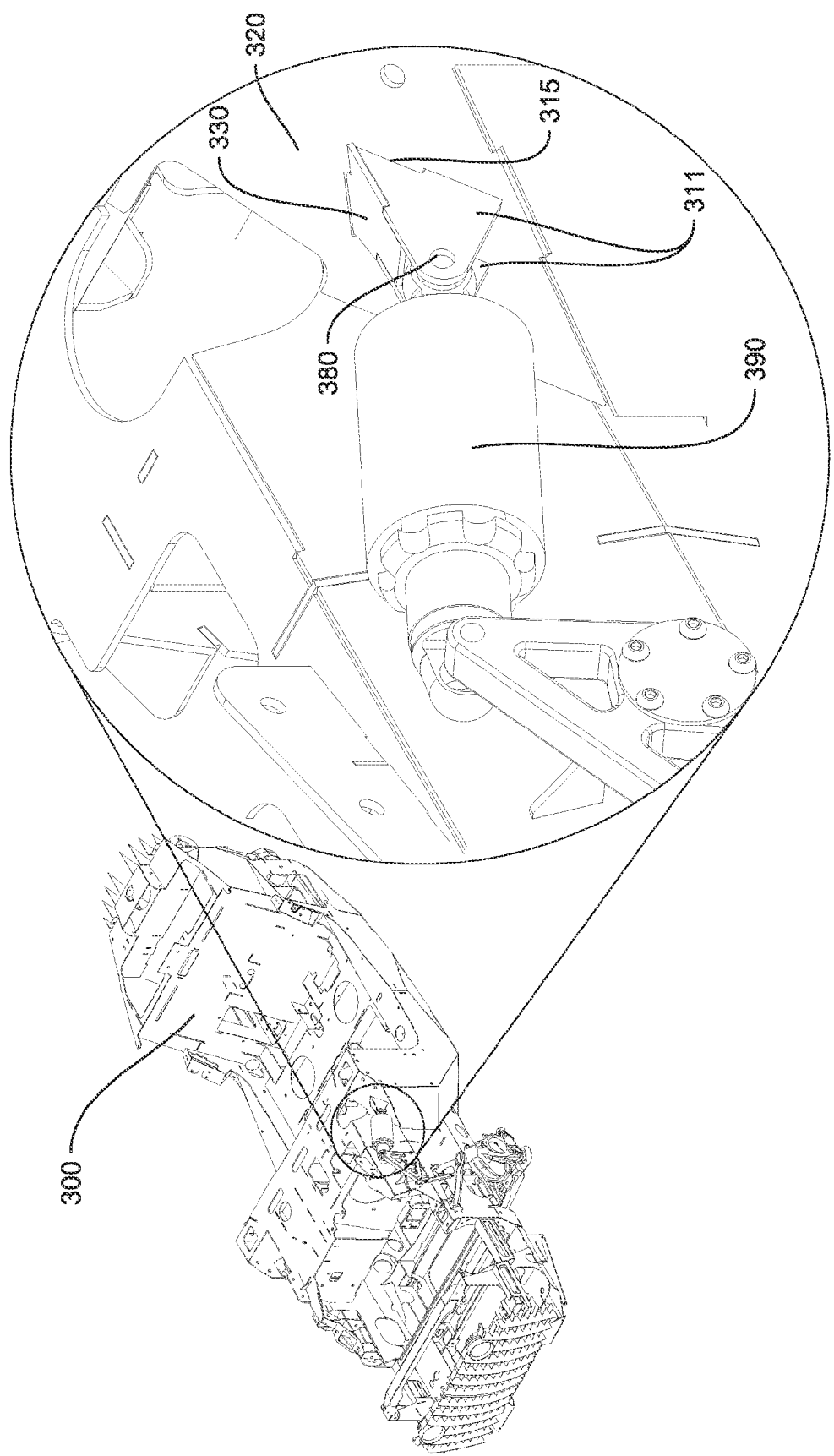
FIGS. 4 through 6 are magnified perspective views of embodiments of appendages protruding from a main body of a vehicle frame.

FIG. 4 shows one example of an embodiment of an appendage 330 protruding from a main body 320 of a vehicle frame 300. The appendage 330 may be formed of plates 311 that may be held to the main body 320 by a plurality of tab and slot connections 315. Such tab and slot connections 315 may also be welded together for increased strength. The appendage 330 may comprise an attachment device comprising two coaxial holes 380 disposed in two of the plates 311 disposed parallel to each other. A component 390, such as a shock absorber, may be secured to the appendage 330 via the attachment device such that the component 390 is obstructed from translational movement while being free to rotate around an axis of the two coaxial holes 380. It is believed that by integrating a fastener for a shock absorber into the main body 320 of a vehicle frame 300 via the appendage 330 as described allows the forces experienced by the shock absorber to be transferred into and born by the main body 320.

Figure 5:
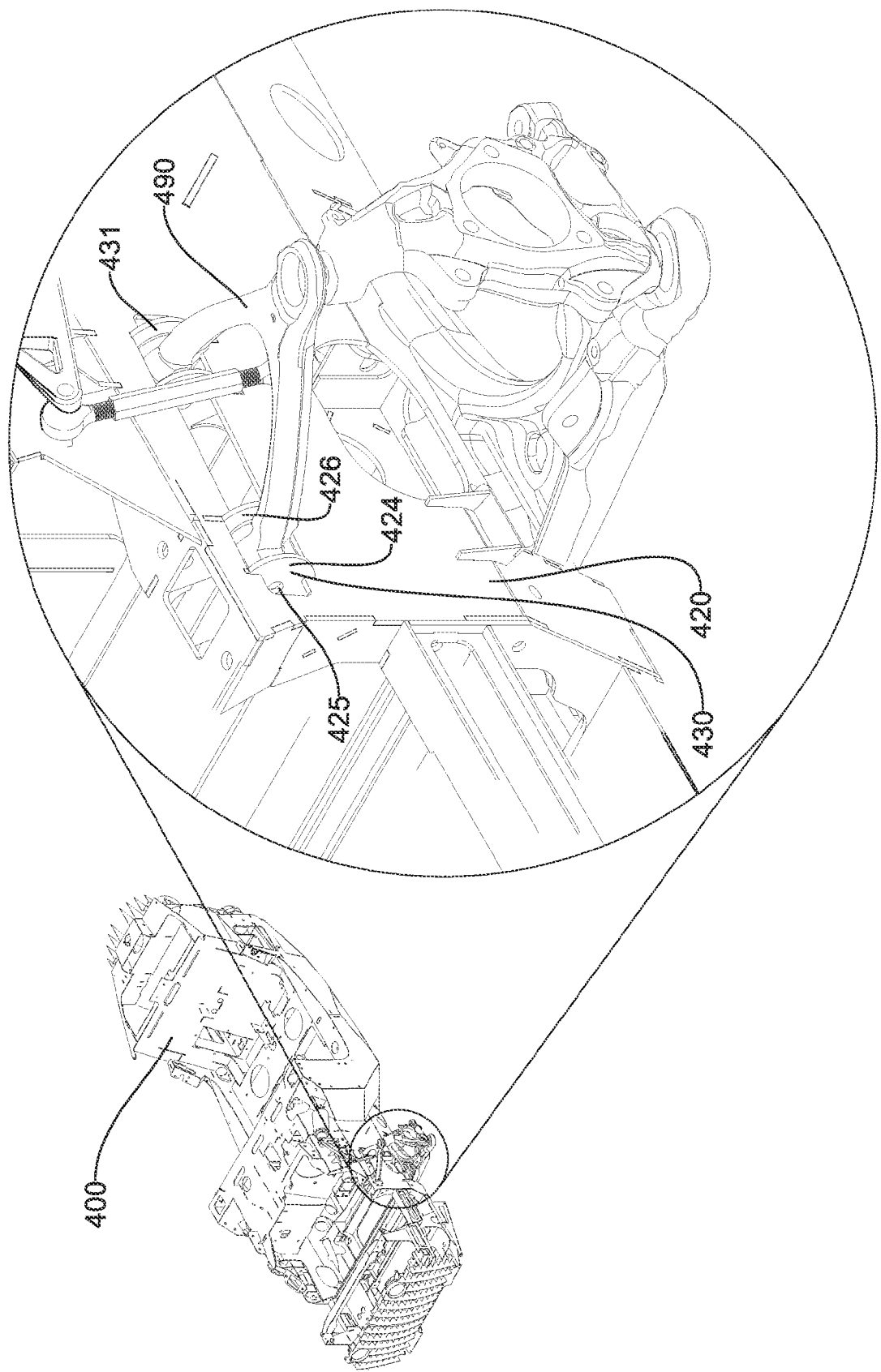

FIG. 5 shows another example of an embodiment of an appendage 430 protruding from a main body 420 of a vehicle frame 400. In this embodiment, two frame members 424, 426 may be disposed parallel to each other and may each comprise a hole 425 coaxial with the other. A component 490, such as a control arm, may be secured to the appendage 430 as well as another appendage 431 spaced from the first appendage 430 such that the component 490 is rotationally independent therefrom.

Figure 6:
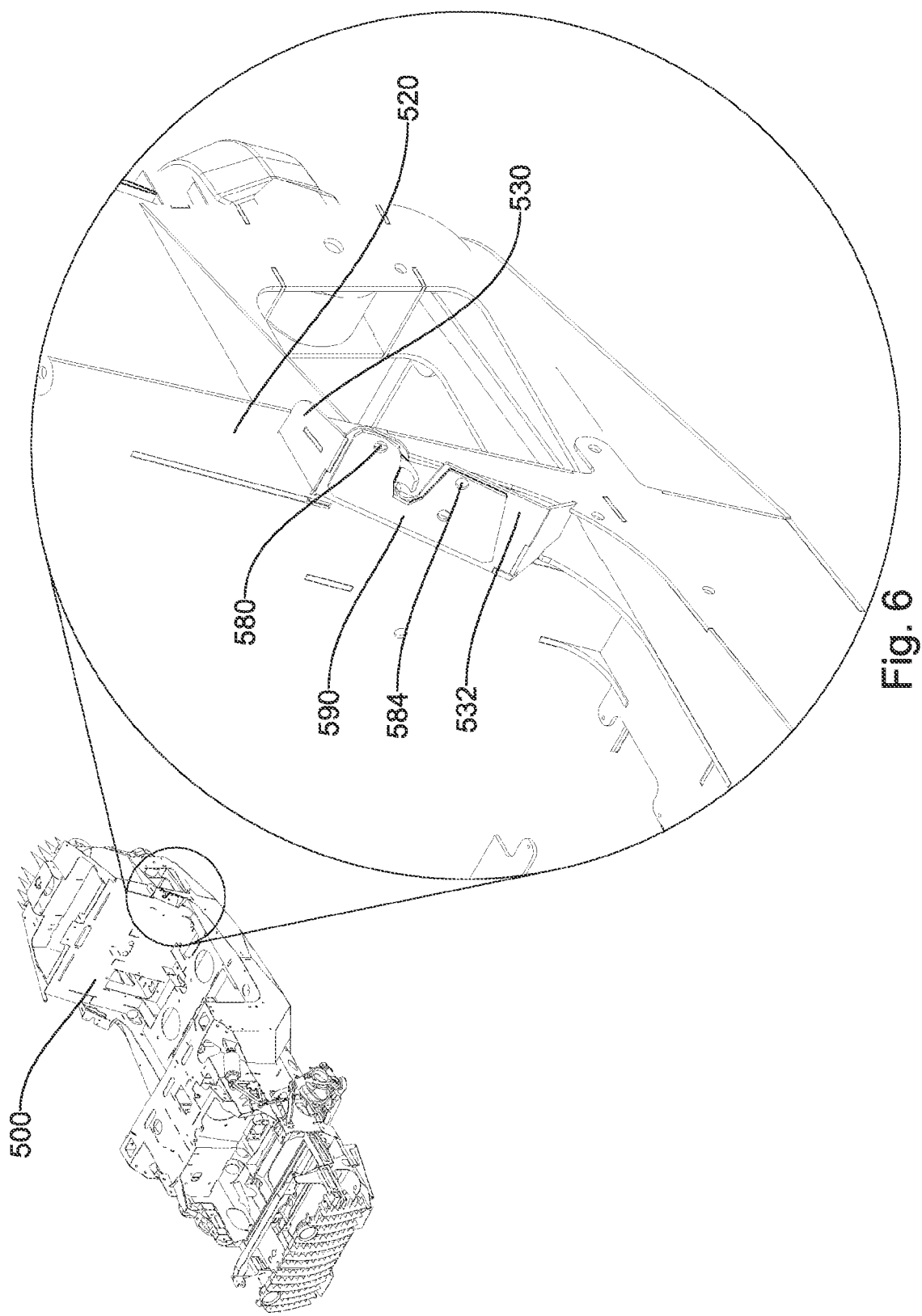

FIG. 6 shows yet another example of an embodiment of an appendage 530 protruding from a main body 520 of a vehicle frame 500. In this embodiment, one interlocking frame member 532 forms only part of the appendage 530 and not any part of the main body 520. The appendage 530 may comprise an attachment device disposed thereon comprising a hole 580 disposed in the interlocking frame member 532. A component 590, such as a door lock, may comprise matching holes 584 to the attachment device to receive bolts.

FIGS. 7a and 7b show embodiments of attachment devices disposed on appendages. For example, FIG. 7a shows a hole 680a disposed in an interlocking frame member 632a forming part of an appendage. In this embodiment, a threaded rivet 628a is secured within the hole 680a. A bolt 684a may be threaded into the threaded rivet 628a to hold a component 690a to the appendage. The threaded rivet 628a may be formed of steel to keep from stripping. In another example, FIG. 7b shows a hole 680b disposed in an interlocking frame member 632b forming part of another appendage. In this embodiment a bolt 684b may be threaded into a nut 686 to hold a component 390b to the appendage.

Whereas the present invention has been described in particular relation to the drawings attached hereto, it should be understood that other and further modifications apart from those shown or suggested herein, may be made within the scope and spirit of the present invention.

What is claimed is:

1. A vehicle frame, comprising:
   a plurality of interlocking frame members forming a three-dimensional structure;
   the three-dimensional structure comprising a main body, the plurality of interlocking frame members is held together by a plurality of tab and slot connections;
   the three-dimensional structure further comprising at least one appendage protruding from the main body, wherein the at least one appendage comprises at least two of the plurality of interlocking frame members and the two of the plurality of interlocking frame members forming the at least one appendage are parallel; and
   wherein the at least one appendage comprises a rotationally independent control arm disposed thereon.

2. The vehicle frame of claim 1, wherein at least one of the plurality of interlocking frame members forms only part of the at least one appendage.

3. The vehicle frame of claim 1, wherein at least two of the plurality of interlocking frame members are generally flat plates.

4. The vehicle frame of claim 3, wherein the generally flat plates are laser cut from larger plates.

5. The vehicle frame of claim 3, wherein the generally flat plates are stamped from larger plates.

6. The vehicle frame of claim 3, wherein at least one of the plurality of interlocking frame members is a bent plate.

7. The vehicle frame of claim 1, wherein the attachment device comprises at least one hole in at least one of the plurality of interlocking frame members forming the at least one appendage.

8. The vehicle frame of claim 7, wherein the at least one hole is in one of the plurality of interlocking frame members forming only part of the at least one appendage.

9. The vehicle frame of claim 7, wherein the attachment device comprises a plurality of holes in a plurality of interlocking frame members all sharing a common axis.

10. The vehicle frame of claim 7, further comprising a threaded rivet secured within the at least one hole.

11. The vehicle frame of claim 10, wherein the threaded rivet is formed of steel.

12. The vehicle frame of claim 7, further comprising a bolt secured within the at Least one hole.

13. The vehicle frame of claim 1, wherein the plurality of tab and slot connections is welded in place.

14. The vehicle frame of claim 1, wherein the plurality of interlocking frame members is formed of aluminum.

15. The vehicle frame of claim 1, wherein a component is secured to the at least one appendage.

16. The vehicle frame of claim 15, wherein the component is secured to at least two appendages spaced from one another.

* * * * *